(12) United States Patent
Sekiguchi et al.

(10) Patent No.: US 12,415,916 B2
(45) Date of Patent: Sep. 16, 2025

(54) DISPERSION RESIN COMPOSITION

(71) Applicant: NIPPON PAPER INDUSTRIES CO., LTD., Kita-ku (JP)

(72) Inventors: Shunji Sekiguchi, Tokyo (JP); Ryuji Doi, Tokyo (JP); Fumiyasu Sakakibara, Tokyo (JP); Takao Yoshimoto, Tokyo (JP); Ryo Koike, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 809 days.

(21) Appl. No.: 17/598,484

(22) PCT Filed: Mar. 10, 2020

(86) PCT No.: PCT/JP2020/010407
§ 371 (c)(1),
(2) Date: Sep. 27, 2021

(87) PCT Pub. No.: WO2020/203103
PCT Pub. Date: Oct. 8, 2020

(65) Prior Publication Data
US 2022/0186014 A1    Jun. 16, 2022

(30) Foreign Application Priority Data
Mar. 29, 2019    (JP) .................... 2019-067270

(51) Int. Cl.
    C08L 23/26    (2025.01)
    C08F 255/02   (2006.01)
(52) U.S. Cl.
    CPC ............ C08L 23/26 (2013.01); C08F 255/02 (2013.01); *C08L 2201/50* (2013.01)
(58) Field of Classification Search
    CPC .... C08F 22/04; C08F 255/02; C08L 23/0815; C08L 33/00; C08L 23/26; C08L 23/06
    See application file for complete search history.

(56) References Cited

U.S. PATENT DOCUMENTS

| | | |
|---|---|---|
| 7,666,941 B2 | 2/2010 | Shiba et al. |
| 8,158,727 B2 | 4/2012 | Onoe et al. |
| 8,173,733 B2 | 5/2012 | Kashihara |
| 2004/0116569 A1 | 6/2004 | Ward et al. |
| 2007/0224435 A1* | 9/2007 | Nishijima ............... C08L 51/06 427/372.2 |
| 2009/0005483 A1 | 1/2009 | Kashihara |
| 2009/0092847 A1 | 4/2009 | Onoe et al. |
| 2012/0135243 A1* | 5/2012 | Onoe ................... C09D 151/06 427/386 |
| 2015/0125688 A1 | 5/2015 | Onoe et al. |
| 2017/0137576 A1 | 5/2017 | Harada |

FOREIGN PATENT DOCUMENTS

| | | |
|---|---|---|
| CN | 101384645 A | 3/2009 |
| CN | 106459524 A | 2/2017 |
| EP | 1 995 268 A1 | 11/2008 |
| EP | 3 176 202 A1 | 6/2017 |
| JP | 10-330561 A | 12/1998 |
| JP | 2007-31472 A | 2/2007 |
| JP | 2007-39645 A | 2/2007 |
| JP | 2008-222896 A | 9/2008 |
| JP | 2009-40920 A | 2/2009 |
| JP | 2009-209181 A | 9/2009 |
| JP | 2011-148871 A | 8/2011 |
| JP | 2018-76428 A | 5/2018 |
| JP | 2018-172223 A | 11/2018 |
| WO | WO 2004/104090 A1 | 12/2004 |
| WO | WO 2015/186733 A1 | 12/2015 |

OTHER PUBLICATIONS

International Search Report mailed on May 26, 2020 in PCT/JP2020/010407 filed on Mar. 10, 2020.
Combined Chinese Office Action and Search Report issued on Oct. 18, 2022 in Chinese Patent Application No. 202080026299.1 (with English translation of office action only), 14 pages.

(Continued)

*Primary Examiner* — Gregory Listvoyb
(74) *Attorney, Agent, or Firm* — Oblon, McClelland, Maier & Neustadt, L.L.P.

(57) ABSTRACT

An object is to provide a dispersion resin composition which can maintain dispersion stability even if the added amount of an emulsifier is reduced. Provided is a dispersion resin composition including, at least: a modified polyolefin resin in which a modification component containing an α,β-unsaturated carboxylic acid derivative with a ring structure has been introduced to a polyolefin resin; and an aqueous dispersion medium, wherein the modified polyolefin resin has a degree of ring opening, represented by the equation (1), of 70 or more:

$$\text{degree of ring opening} = \text{modification degree } K \times \text{rate of ring opening } R \quad (1)$$

(in the equation (1), the modification degree K represents a containing rate (% by weight) of the α,β-unsaturated carboxylic acid derivative relative to the polyolefin resin, and the rate of ring opening R represents a rate of ring opening (%) of the ring structure in the α,β-unsaturated carboxylic acid derivative).

9 Claims, No Drawings

(56) References Cited

OTHER PUBLICATIONS

Extended European Search Report issued on Nov. 29, 2022 in European Patent Application No. 20783013.4, 8 pages.
Combined Taiwanese Office Action and Search Report issued Jun. 16, 2023 in Taiwanese Patent Application No. 11220584440, 6 pages.
Japanese Submission of Information issued Feb. 6, 2024 in Japanese Patent Application No. 2021-511326 (with English translation), 5 pages.
Japanese Office Action issued Feb. 20, 2024 in Japanese Patent Application No. 2021-511326 (with English translation), 5 pages.

\* cited by examiner

DISPERSION RESIN COMPOSITION

FIELD

The present invention relates to a dispersion resin composition.

BACKGROUND

Polyolefin-based resins such as polypropylene or polyethylene are thermoplastic general-purpose resins. Polyolefin-based resins are inexpensive and possess many excellent characteristics such as molding properties, chemical resistance, weather resistance, water resistance, and electrical properties. Therefore, polyolefin-based resins have been used as sheets, films, molded products, and the like, in a wide range of fields. However, nonpolar resin molded products of such polyolefin-based resins are different from polar substrates such as polyurethane-based resins, polyamide resins, acryl-based resins, polyester resins, or metals, due to their low polarity and crystallizability. Therefore, nonpolar resin molded products are known to be poor adhesion substrates and to have difficulty in bonding between the same types or different types of substrates and in painting.

To address this problem, it has been proposed to use acid-modified (modified with unsaturated carboxylic acid and/or an anhydride thereof) propylene-based random copolymers as a pre-paint treatment agent or an adhesive agent. Also, from the viewpoint of environmental impact, acid-modified propylene-based random copolymers have recently shifted from known organic solvent-based paints to aqueous paints. Furthermore, there is a problem concerning compositions containing an emulsifier and an acid-modified propylene-based random copolymer in that when formulated as a paint and then applied onto a substrate and dried, the emulsifier is likely to bleed out onto the surface of the coating film, which leads to the occurrence of appearance failure. Also, when another paint is further applied onto the coating surface of the composition, a problem occurs where an adhesion force between the paints is reduced. Therefore, there has been proposed a composition which includes an acid-modified propylene-based random copolymer but does not include an emulsifier (for example, see Patent Literatures 1 to 4).

CITATION LIST

Patent Literature

Patent Literature 1: International Publication No. 2004/104090
Patent Literature 2: Japanese Patent Application Laid-Open No. 2007-031472
Patent Literature 3: Japanese Patent Application Laid-Open No. 2009-040920
Patent Literature 4: Japanese Patent Application Laid-Open No. 2007-039645

SUMMARY

Technical Problem

In the aqueous resin composition described in Patent Literature 1, a solvent having high water solubility is used. Accordingly, an aqueous dispersion of a polyolefin having an unsaturated carboxylic acid structural unit is produced without substantially containing an emulsifying auxiliary agent which has a boiling point at normal pressure of 185° C. or higher. Also, in the aqueous resin compositions described in Patent Literature 2 and Patent Literature 3, a solvent with water solubility, such as an ethylene glycol-based solvent or an alcohol-based solvent, is used. Accordingly, an aqueous dispersion of a modified polyolefin in which a carboxyl group or an unsaturated carboxylic acid has been introduced is produced substantially without using an emulsifier.

For obtaining an adhesive layer or a coating film having excellent adhesion, water resistance, and chemical resistance with an acid modified polyolefin resin, it is desirable to use acid modified polyolefin resins having a high molecular weight and a low acid modification degree. However, preparing aqueous dispersions of these resins is highly difficult. The solvents with high water solubility used in the above-described Patent Literatures are inferior in performance as emulsifying auxiliary agent in comparison to an emulsifier such as a polyoxyalkylene alkyl ether. Therefore, it is difficult to obtain an adequate aqueous dispersion of an acid-modified polyolefin resin having a high molecular weight and a low acid modification degree.

The aqueous resin dispersion described in Patent Literature 4, which has a small dispersion particle diameter and excellent stability, is obtained by linking a hydrophilic polymer such as a polyether resin to a propylene-based polymer so as to enhance dispersibility in water, without substantially adding an emulsifier even if the aqueous resin dispersion has a high molecular weight. However, since a highly hydrophilic structure has been introduced into the molecule, an adhesive layer or a coating film is not necessarily sufficient for water resistance.

An object of the present invention is to provide a dispersion resin composition which can maintain dispersion stability even if the added amount of an emulsifier is reduced.

Solution to Problem

The present inventors conducted intensive research in view of the above-described problem. As a result, they have found that the issues can be solved by including a modified polyolefin resin having a degree of ring opening, represented by a prescribed equation, of 70 or more and an aqueous dispersion medium. Thus, the present invention has been accomplished.

That is, the present inventors provide the following [1] to [6].

[1] A dispersion resin composition comprising, at least:
  a modified polyolefin resin in which a modification component containing an α,β-unsaturated carboxylic acid derivative with a ring structure has been introduced to a polyolefin resin; and
  an aqueous dispersion medium, wherein
  the modified polyolefin resin has a degree of ring opening, represented by the equation (1), of 70 or more:

$$\text{degree of ring opening} = \text{modification degree } K \times \text{rate of ring opening } R \qquad (1)$$

(in the equation (1), the modification degree K represents a containing rate (% by weight) of the α,β-unsaturated carboxylic acid derivative relative to the polyolefin resin, and the rate of ring opening R represents a rate of ring opening (%) of the ring structure in the α,β-unsaturated carboxylic acid derivative).

[2] The dispersion resin composition according to [1], wherein a containing amount of an emulsifier is less than 10% by weight.

[3] The dispersion resin composition according to [1] or [2], wherein the degree of ring opening R is 60% or more.

[4] The dispersion resin composition according to any one of [1] to [3], wherein a melting point of the modified polyolefin resin is 50° C. or higher.

[5] The dispersion resin composition according to any one of [1] to [4], wherein a weight-average molecular weight of the modified polyolefin resin is 10,000 or more.

[6] The dispersion resin composition according to any one of [1] to [5], wherein the polyolefin resin includes at least one type selected from the group consisting of an ethylene-propylene copolymer, a propylene-1-butene copolymer, and an ethylene-propylene-1-butene copolymer.

Advantageous Effects of Invention

According to the present invention, there can be provided a dispersion resin composition which can maintain dispersion stability even if the added amount of an emulsifier is reduced.

DESCRIPTION OF EMBODIMENTS

Hereinafter, the present invention will be described in detail according to suitable embodiments. As described herein, the notation "AA to BB" indicates AA or more and BB or less.

[1. Dispersion Resin Composition]

The dispersion resin composition of the present invention includes at least a modified polyolefin resin in which a modification component containing an α,β-unsaturated carboxylic acid derivative with a ring structure has been introduced to a polyolefin resin, and an aqueous dispersion medium. The modified polyolefin resin has a degree of ring opening, represented by the equation (1), of 70 or more.

$$\text{Degree of ring opening} = \text{modification degree } K \times \text{rate of ring opening } R \quad (1)$$

(In the equation (1), the modification degree K represents a containing rate (% by weight) of the α,β-unsaturated carboxylic acid derivative relative to the polyolefin resin, and the rate of ring opening R represents a rate of ring opening (%) of the ring structure in the α,β-unsaturated carboxylic acid derivative.)

When the degree of ring opening, represented by the equation (1), of the modified polyolefin resin is 70 or more, there can be obtained a dispersion resin composition which can maintain dispersion stability even if the added amount of an emulsifier is reduced. It is inferred that this is due to the following reasons.

The modification degree K is the amount of the α,β-unsaturated carboxylic acid derivative with a ring structure introduced to the polyolefin resin. The rate of ring opening R is the opening rate of the ring structure in the α,β-unsaturated carboxylic acid derivative. In the present invention, the ring structure of the α,β-unsaturated carboxylic acid derivative is opened by a water molecule. Therefore, the ring-opened structure has a dicarboxy group. That is, it can be said that, in the modified polyolefin resin of the present invention, the degree of ring opening is a parameter relating to the existing amount of a carboxy group in the modified polyolefin resin.

When a neutralizer such as organic amines exists, the above-described carboxy group exists in the aqueous dispersion medium as a carboxylic acid ion whose counter ion is a conjugate acid of organic amines. This carboxylic acid ion has a negative charge. Therefore, the dispersion stability of the modified polyolefin resin of the present invention in the aqueous dispersion medium is achieved due to an electrostatic repulsion force of each carboxylic acid ion. It is thus inferred that this enables the dispersion resin composition of the present invention to maintain dispersion stability even if the amount of an emulsifier is reduced.

There has been known a modified polyolefin resin in which an α,β-unsaturated carboxylic acid derivative with a ring structure such as maleic anhydride has been introduced to a polyolefin resin. However, the known modified polyolefin resin takes advantage of the ring structure of the α,β-unsaturated carboxylic acid derivative, which has been introduced to the polyolefin resin, for a chemical reaction and exerts various effects. Therefore, it is desirable that the ring structure of the α,β-unsaturated carboxylic acid derivative introduced to the polyolefin resin is not opened. That is, the degree of ring opening is desirably low.

On the other hand, in the modified polyolefin resin in the present invention, the degree of ring opening of the ring structure of the α,β-unsaturated carboxylic acid derivative is set to 70 or more. That is, the degree of ring opening is set high.

For maintaining dispersion stability while reducing the added amount of an emulsifier, it is effective to increase the modification degree. However, when the modification degree is excessively high, the water resistance tends to decrease. Therefore, when water resistance of a coating film or an adhesive layer is particularly required, it is preferable not to increase the modification degree so as to maintain dispersion stability while reducing the added amount of an emulsifier. The present inventors have conducted various research and found that increasing the rate of ring opening instead of the modification degree is also effective in maintaining dispersion stability while reducing the added amount of an emulsifier.

In the modified polyolefin resin in which an α,β-unsaturated carboxylic acid derivative with a ring structure such as maleic anhydride has been introduced to a polyolefin resin, the ring structure is opened by a water molecule. Therefore, when it is exposed to a water molecule in the atmosphere, for example, the rate of ring opening R increases over time. However, the water content in the atmosphere cannot reach the inside of the modified polyolefin resin. Accordingly, the increase of the rate of ring opening R levels off at a certain range.

The standard at which the increase of the rate of ring opening R levels off also depends on the ambient moisture and the specific surface area of a resin. In general, the higher the specific surface area, the higher the standard at which the rate of ring opening R levels off. However, even with a commonly used pellet form, the rate of ring opening R does not exceed 50% under long term exposure to the atmosphere.

The present inventors supposed that the dispersion stability can be effectively improved while keeping the modification degree relatively low by increasing the rate of ring opening as much as possible, and conducted intensive research on this basis. As a result, the present inventors have found that the rate of ring opening R can become more than 50% when the modified polyolefin resin is stored for a certain period of time under high humidity and high temperature conditions, which significantly improves the dispersion stability of the dispersion resin composition.

[1-1. Modified Polyolefin Resin]

The modified polyolefin resin is obtained by introducing, to a polyolefin resin, a modification component containing an α,β-unsaturated carboxylic acid derivative with a ring structure. Also, the modified polyolefin resin has a degree of ring opening, represented by the above-described equation (1), of 70 or more and preferably 100 or more. When the degree of ring opening is 70 or more, a dispersion resin composition prepared with the modified polyolefin resin, in which a modification component containing an α,β-unsaturated carboxylic acid derivative with a ring structure has been introduced to a polyolefin resin, can maintain dispersion stability even if the amount of an emulsifier is reduced. The upper limit of the degree of ring opening is preferably 600 or less, more preferably 450 or less, and still more preferably 300 or less.

The degree of ring opening is defined as the product of the modification degree K and the rate of ring opening R. Details of the modification degree K and the rate of ring opening R will be described hereinbelow.

The modification degree K is the graft weight (% by weight) of the α,β-unsaturated carboxylic acid derivative. That is, the modification degree K represents the ratio of the α,β-unsaturated carboxylic acid derivative with a ring structure introduced to the polyolefin resin. The modification degree K can be set depending on the degree of ring opening of the modified polyolefin resin. The modification degree K is more preferably 1.2 to 6.0% by weight, and still more preferably 1.4 to 5.0% by weight.

The modification degree K can be adjusted by the use amounts of an α,β-unsaturated carboxylic acid derivative with a ring structure and a radical generator, the reaction temperature, the reaction time, and the like, when the α,β-unsaturated carboxylic acid derivative with a ring structure is introduced to a polyolefin resin.

The modification degree K may be calculated in the following manner in accordance with JIS K-0070 (1992).

About 0.5 g of a modified polyolefin resin and about 100 g of toluene both precisely weighed are charged in a 300 ml separable flask equipped with a cooling tube and a thermometer. The mixture is stirred and dissolved while heated on a hot stirrer so that the internal temperature becomes 80° C. After the resin has dissolved, 15 ml of methanol is added, and the mixture is held for 5 minutes. After that, 5 to 6 drops of an indicator (a 1% phenolphthalein-methanol solution) are added, and titration is performed with a 0.1 mol/L potassium hydroxide-ethanol solution. From the titration amount needed for neutralization, the modification degree K of the modified polyolefin resin can be calculated according the following equation. The measurement of the modification degree K is performed using a sample purified by dissolving the modified polyolefin resin, before a ring opening treatment, in an organic solvent such as toluene and, after that, dropping the solution in a large excess of methanol for precipitation.

$$K = \{B \times f \times F/(S \times 1000)\} \times 100$$

Herein, K represents the modification degree (% by weight); B represents the titration amount (ml) of the potassium hydroxide-ethanol solution; f represents the factor of the 0.1 mol/L potassium hydroxide-ethanol solution; F is the formular weight of the α,β-unsaturated carboxylic acid derivative×1/10; and S represents the weight (g) of the modified polyolefin resin.

The rate of ring opening R is the opening rate (%) of the ring structure in the α,β-unsaturated carboxylic acid derivative. That is, the rate of ring opening R represents the rate of ring opening of the α,β-unsaturated carboxylic acid derivative with a ring structure introduced to a polyolefin resin. The rate of ring opening R can be set depending on the degree of ring opening of the modified polyolefin resin. The rate of ring opening R is preferably 50 to 100% and more preferably 60 to 80%.

Details of the measurement of the rate of ring opening R is as follows.

First, the modified polyolefin resin is dissolved in an organic solvent to obtain a solution. Next, this solution is applied onto a KBr plate and dried to form a thin film. Using an FT-IR (for example, "FT/IR-4100", manufactured by JASCO Corporation), the infrared absorption spectrum at 400 to 4000 cm$^{-1}$ is observed. Analysis is performed by an attached software (for example, "Spectro Manager", manufactured by JASCO Corporation).

The peak appearing at a wave number of 1700 to 1750 cm$^{-1}$ is assigned to the peak attributable to the carbonyl group of the α,β-unsaturated carboxylic acid derivative which is ring-opened. The peak height thereof is defined as A. The peak appearing at a wave number of 1750 to 1820 cm$^{-1}$ is assigned to the peak attributable to the carbonyl group of the α,β-unsaturated carboxylic acid derivative which is not ring-opened. The peak height thereof is defined as B. The rate of ring opening R (%) can be calculated from the formula (A/(A+B)×100). The rate of ring opening in Examples described later is a value calculated by this method.

The melting point of the modified polyolefin resin is preferably 50 to 120° C., more preferably 60 to 110° C., and still more preferably 60° C. to 100° C. When the melting point is 50° C. or higher, sufficient adhesion can be exerted. When the melting point is 120° C. or lower, excellent adhesion can be exerted even if baking is performed at relatively low temperature.

The melting point can be adjusted by, for example, the type of the base resin of the polyolefin resin.

Details of the measurement of the melting point by DSC is as follows.

In accordance with JIS K7121 (1987), about 5 mg of a sample was held in a heating and melting state at 150° C. for 10 minutes, using a DSC measurement device (for example, "DISCOVERY DSC2500", manufactured by TA Instrument, Japan). The temperature is decreased at a speed of 10° C./min. After −50° C. has been reached, the temperature is stably held for 5 minutes. After that, the temperature is increased at 10° C./min to 150° C., and the melting peak temperature when melted is measured as the melting point.

The weight-average molecular weight of the modified polyolefin resin is preferably 10,000 to 200,000, more preferably 50,000 to 180,000, and still more preferably 70,000 to 170,000.

The weight-average molecular weight may be adjusted, for example, by the weight-average molecular weight of the base resin of the polyolefin resin, the amount of the modification component to be used, and the like.

Details of the measurement conditions of GPC are as follows. The weight-average molecular weight of the modified polyolefin resin in Examples described later is a value measured under this condition.

Measuring instrument: HLC-8320GPC (manufactured by Tosoh Corporation)
Eluent: tetrahydrofuran
Column: TSKgel (manufactured by Tosoh Corporation)
Standard substance: polystyrene (manufactured by Tosoh Corporation, manufactured by GL Sciences Inc.)
Detector: differential refractometer (manufactured by Tosoh Corporation)

The average particle diameter of the modified polyolefin resin in the dispersion resin composition is preferably 50 nm or more, more preferably 60 nm or more, and still more preferably 70 nm or more. On the other hand, the upper limit thereof is preferably 250 nm or less, more preferably 230 nm or less, and still more preferably 210 nm or less. The average particle diameter represents the degree of dispersion, and the smaller the numerical value, the better the dispersibility.

In the present specification, the average particle diameter is a Z average particle diameter measured by a dynamic light scattering method. Examples of the measuring instrument may include Zetasizer Nano ZS manufactured by Malvern Panalytical Ltd.

(Polyolefin Resin)

The polyolefin resin is not particularly limited. As the olefin constituting the polyolefin resin, an α-olefin is suitably used. Examples of the α-olefin may include ethylene, propylene, 1-butene, 1-pentene, 1-hexene, 1-heptene, and 1-octene.

The polyolefin resin may be one type of the olefin polymer alone, and may be a copolymer of two or more types of the olefin polymers. When the polyolefin resin is a copolymer, the polyolefin resin may be a random copolymer or a block copolymer.

From the viewpoint of causing the polyolefin resin to exhibit sufficient adhesion to nonpolar resin substrates such as a polypropylene substrate, a polypropylene (propylene homopolymer), an ethylene-propylene copolymer, a propylene-1-butene copolymer, and an ethylene-propylene-1-butene copolymer are preferable.

Herein, "polypropylene" represents a polymer in which a basic unit is a constitutional unit derived from propylene. "Ethylene-propylene copolymer" represents a copolymer in which a basic unit is a constitutional unit derived from ethylene and propylene. "Propylene-1-butene copolymer" represents a copolymer in which a basic unit is a constitutional unit derived from propylene and butene. "Ethylene-propylene-1-butene copolymer" represents a copolymer in which a basic unit is a constitutional unit derived from ethylene, propylene, and butene. As long as the amount does not significantly impair the intrinsic performance of the resin, these (co)polymers may contain a small amount of a constitutional unit derived from other olefins other than the basic unit.

The polyolefin resin preferably contains 50 mol % or more of the constitutional unit derived from propylene in 100 mol % of the constitutional unit. When the constitutional unit derived from propylene is contained in the above-described range, adhesion to a nonpolar resin substrate such as a propylene resin can be maintained.

When the ethylene-propylene copolymer or the propylene-1-butene copolymer is a random copolymer, it is preferable that, in 100 mol % of the constitutional unit, the constitutional unit derived from ethylene or the constitutional unit derived from butene is 5 to 50 mol %, and the constitutional unit derived from propylene is 50 to 95 mol %.

The lower limit of the melting point of the polyolefin resin is preferably 50° C. or higher, and more preferably 60° C. or higher. By setting the melting point of the polyolefin resin to 50° C. or higher, sufficient coating film strength can be exhibited when the modified polyolefin resin is used in an application such as an ink, a coating material, or the like. Therefore, adhesion to the substrate can be sufficiently exhibited. When it is used as an ink, blocking during printing can be suppressed. Further, the upper limit thereof is preferably 120° C. or lower, more preferably 110° C. or lower, and even more preferably 100° C. or lower. By setting the melting point of the polyolefin resin to 120° C. or lower, the coating film can be prevented from becoming too hard when the modified polyolefin resin is used in an application such as an ink, a coating material, or the like. Therefore, the coating film can exhibit moderate flexibility.

As one embodiment of the melting point of the polyolefin resin, 50 to 120° C. is preferable, 60 to 110° C. is more preferable, and 60 to 100° C. is still more preferable.

(Modification Component)

The modification component includes an α,β-unsaturated carboxylic acid derivative with a ring structure. Examples of the α,β-unsaturated carboxylic acid derivative with a ring structure may include α,β-unsaturated carboxylic acid derivatives with a ring structure such as maleic anhydride, citraconic anhydride, itaconic anhydride, and aconitic anhydride. Among these, maleic anhydride is preferable.

The modification component may include components other than α,β-unsaturated carboxylic acid derivatives with a ring structure. Examples thereof may include an α,β-unsaturated carboxylic acid such as maleic acid, fumaric acid, citraconic acid, mesaconic acid, itaconic acid, and aconitic acid; a (meth)acrylic acid ester such as methyl (meth)acrylate, ethyl (meth)acrylate, n-butyl (meth)acrylate, cyclohexyl (meth)acrylate, hydroxyethyl (meth)acrylate, isobornyl (meth)acrylate, glycidyl (meth)acrylate, octyl (meth)acrylate, lauryl (meth)acrylate, isodecyl (meth)acrylate, tridecyl (meth)acrylate, stearyl (meth)acrylate, benzyl (meth)acrylate, phenyl (meth)acrylate, dimethylaminoethyl (meth)acrylate, diethylaminoethyl (meth)acrylate, 2-hydroxyethyl (meth)acrylate, N,N-dimethylaminoethyl (meth)acrylate, and acetoacetoxyethyl (meta)acrylate; monomethyl fumarate, monoethyl fumarate, monopropyl fumarate, monobutyl fumarate, dimethyl fumarate, diethyl fumarate, dipropyl fumarate, dibutyl fumarate, monomethyl maleate, monoethyl maleate, monopropyl maleate, monobutyl maleate, dimethyl maleate, diethyl maleate, dipropyl maleate, dibutyl maleate, maleimide, and N-phenyl maleimide.

As a method for introducing a modification component containing an α,β-unsaturated carboxylic acid derivative with a ring structure into a polyolefin resin, a known method may be used. Examples of such a method may include a method in which a polyolefin resin is melted or dissolved in a solvent, and a modification component containing an α,β-unsaturated carboxylic acid derivative with a ring structure and a radical generator are added thereto to modify the polyolefin resin.

The radical generator, for example, can be selected from known radical generators. Examples of the radical generator may include peroxides (e.g., di-tert-butyl peroxide, tert-butyl hydroperoxide, dicumyl peroxide, benzoyl peroxide, tert-butyl peroxide benzoate, methyl ethyl ketone peroxide, and di-tert-butyl diperphthalate, and azonitriles (e.g., azobisisobutyronitrile).

As the reaction apparatus, for example, a reaction tank having a jacket which can be warmed with hot water or steam, or a twin screw extruder can be used.

The reaction may be carried out in a batch manner or may be carried out in a continuous manner.

By introducing the modification component containing an α,β-unsaturated carboxylic acid derivative with a ring structure into the polyolefin resin, a graft polymer can be usually obtained which has polyolefin as a main chain and a side chain containing a constitutional unit derived from the modification component containing the α,β-unsaturated carboxylic acid derivative with the ring structure.

[Producing Method]

The method for producing the modified polyolefin resin is not particularly limited. An example will be described below.

First, a polyolefin resin is prepared. The polyolefin resin may be prepared by polymerizing ethylene and an α-olefin such as propylene, 1-butene, 1-pentene, 1-hexene, 1-heptene, 1-octenee, and the like in the presence of a catalyst such as a Ziegler-Natta catalyst or a metallocene catalyst. As the polyolefin resin, a commercially available product may be used.

Next, a modification component containing an α,β-unsaturated carboxylic acid derivative with a ring structure is introduced into the polyolefin resin. The modification method may be performed by a known method, for example, a graft polymerization method. In the graft polymerization reaction, a radical generator may be used. Examples of the method for obtaining a modified polyolefin resin may include a solution method in which the polyolefin resin and the modification component containing an α,β-unsaturated carboxylic acid derivative with a ring structure are heated and dissolved in a solvent such as toluene, and a radical generator is added thereto; and a melt-kneading method in which the polyolefin resin, the modification component containing an α,β-unsaturated carboxylic acid derivative with a ring structure, and a radical generator are added to an instrument such as a Banbury mixer, a kneader, or an extruder, and kneaded. Herein, the modification component containing an α,β-unsaturated carboxylic acid derivative with a ring structure may be added collectively, or may be added sequentially.

In the graft polymerization reaction, the modification component containing an α,β-unsaturated carboxylic acid derivative with a ring structure is preferably used in an amount of 1.0 to 12.0 parts by mass relative to 100 parts by mass of the polyolefin resin, from the viewpoint of grafting it in a preferable amount.

A preferable range of the added amount of the radical generator relative to a total of 100% by weight of the modification component containing an α,β-unsaturated carboxylic acid derivative with a ring structure is as follows. The lower limit of the added amount is preferably 1% by weight or more, and more preferably 10% by weight or more. When the added amount of the radical generator is 1% by weight or more, grafting efficiency can be maintained. On the other hand, the upper limit of the added amount is preferably 200% by weight or less, and more preferably 100% by weight or less. When the added amount of the radical generator is 200% by weight or less, it is economical.

An unreacted product, which is not graft polymerized to the polyolefin resin, may be removed by, for example, extraction with a poor solvent. In this manner, a graft polymer is obtained.

The modified polyolefin resin can be produced by the reaction between the graft polymer obtained so as to have a degree of ring opening of 70 or more and a water molecule. For example, the modified polyolefin resin can be produced by a ring opening treatment such as immersing a modified polyolefin resin in water or placing a modified polyolefin resin under humidified conditions. The rate of ring opening (%) and the degree of ring opening can be adjusted by changing temperatures of the water and the humidified conditions and times under the immersion and the humidified conditions.

Increasing the rate of ring opening of the modified polyolefin resin as much as possible can effectively improve dispersion stability even while keeping the modification degree relatively low. As an example of the method for increasing the rate of ring opening, the rate of ring opening can be increased to 60 to 70% by filling a container on its bottom with water, placing pellets of the modified polyolefin resin on a false bottom such that the pellets do not directly touch the water, sealing the container, and storing the sealed container in a dryer at 50° C. for 3 or more days. Furthermore, the rate of ring opening can also be increased to 65 to 80% by continuously filling a sealed space with water vapor to produce a place at 50° C. and a humidity of 100% and storing pellets of the modified polyolefin resin in the place for 2 or more days. By either method, the storage temperature is increased to higher than room temperature, thereby increasing the reactivity between the ring structure and a water molecule, while the vapor pressure is increased. Accordingly, the water molecule can easily enter the inside of the pellet. As a result, the rate of ring opening can become higher than that obtained when stored in the usual atmosphere or when merely immersed in water at room temperature.

[1-2. Aqueous Dispersion Medium]

The dispersion resin composition of the present invention contains an aqueous dispersion medium. The aqueous dispersion medium may be water alone or a solvent soluble in water may be used in combination with water. Examples of the solvent which is soluble in water may include lower alcohols such as methanol, ethanol, and isopropyl alcohol; and lower ketones such as dimethylformamide, tetrahydrofuran, acetone, and methyl ethyl ketone.

The amount of the aqueous dispersion medium to be used is not particularly limited, and may be freely changed depending on the use application of the dispersion resin composition. As an example, an amount in which the solid concentration of the modified polyolefin resin is 10 to 50% by weight is preferable, and an amount in which the solid concentration is 20 to 40% by weight is further preferable.

[1-3. Emulsifier]

As the emulsifier, conventionally known ones that can be added for the purpose of stabilizing the dispersion when dispersing the modified polyolefin resin in an aqueous dispersion medium may be used. Examples thereof may include a nonionic surfactant and an anionic surfactant.

Examples of the nonionic surfactant may include a polyoxyethylene alkyl ether, a polyoxyethylene polyoxypropylene alkyl ether, a polyoxyethylene derivative, a polyoxyethylene fatty acid ester, a polyoxyethylene polyhydric alcohol fatty acid ester such as a polyoxyethylene sorbitan fatty acid ester, a polyoxyethylene polyoxypropylene polyol, a sorbitan fatty acid ester, a polyoxyethylene hardened castor oil, a polyoxyalkylene polycyclic phenyl ether, a polyoxyethylene alkylamine, an alkylalkanolamide, and a polyalkylene glycol (meth)acrylate.

Examples of the anionic surfactant may include an alkyl sulfate ester salt, a polyoxyethylene alkyl ether sulfate salt, an alkylbenzene sulfonic acid salt, an α-olefin sulfonic acid salt, a methyl taurate, a sulfosuccinic acid salt, an ether sulfonic acid salt, an ether carboxylic acid salt, a fatty acid salt, a naphthalene sulfonic acid formalin condensate, a polyoxyethylene phenyl ether phosphate, a polyoxyethylene alkyl ether phosphate, a dioctyl sulfosuccinic acid ester salt, an alkylamine salt, a quaternary ammonium salt, an alkyl betaine, and an alkyl amine oxide.

In the dispersion resin composition of the present invention, the containing amount of the emulsifier is preferably less than 10% by weight, and more preferably less than 5% by weight. The lower limit is not particularly limited, and the composition may not contain an emulsifier. When the containing amount of the emulsifier is less than 10% by weight, deterioration in adhesion due to addition of an emulsifier may be suppressed.

The dispersion resin composition of the present invention is low in adhesion (adhesiveness) and useful as an intermediate medium for a substrate onto which a paint or the like is difficult to be applied. For example, the dispersion resin composition of the present invention can be used as an adhesive agent between polyolefin-based substrates such as polypropylene and polyethylene which are poor in adhesion (adhesiveness). In such a case, the dispersion resin composition of the present invention can be used regardless of whether the substrate is surface-treated with plasma, corona, or the like.

The dispersion resin composition of the present invention can also exert excellent adhesiveness with metal and resin. Examples of the metal may include aluminum, an aluminum alloy, nickel, and stainless steel. Examples of the resin may include a nonpolar resin (such as a polyolefin resin), a polyurethane-based resin, a polyamide-based resin, an acryl-based resin, a polyester-based resin, and a polyethylene terephthalate-based resin. Therefore, the dispersion resin composition of the present invention can be used as an adhesive agent, a primer, and a binder for paints or inks, or components thereof.

In addition to the modified polyolefin resin and the aqueous dispersion medium, the dispersion resin composition of the present invention may further include at least one component selected from the group consisting of a solution, a curing agent, and an adhesive component.

Solution

Examples of the solution may include an organic solvent. Examples of the organic solvent may include an aromatic solvent such as toluene and xylene; an ester solvent such as ethyl acetate and butyl acetate; a ketone solvent such as methyl ethyl ketone, methyl butyl ketone, and ethyl cyclohexanone; and an aliphatic or alicyclic hydrocarbon solvent such as cyclohexane, methylcyclohexane, nonane, and decane. From the viewpoint of environmental issues, an organic solvent other than an aromatic solvent is preferable, and a mixed solvent of an alicyclic hydrocarbon solvent and an ester solvent or a ketone solvent is more preferable.

As the organic solvent, one type thereof may be solely used, and two or more types thereof may also be used in combination.

In order to increase the storage stability of the solution of the resin composition containing the modified polyolefin resin and the solution, one type of an alcohol (e.g., methanol, ethanol, propanol, isopropyl alcohol, and butanol), and a propylene-based glycol ether (e.g., propylene glycol methyl ether, propylene glycol ethyl ether, and propylene glycol t-butyl ether) may be solely used, and two or more types thereof may also be used in combination. In this case, it is preferable to add 1 to 20% by weight of the compound relative to the above-described organic solvent.

Further, as the solution, for example, a compound represented by the following general formula (1) and having a molecular weight of less than 200 is preferable.

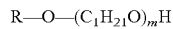  Formula (1)

In the general formula (1), R is $C_nH_{2n+1}$, and n is an integer of 10 or less. n is preferably an integer of 8 or less, more preferably an integer of 7 or less, still more preferably an integer of 6 or less, still more preferably an integer of 5 or less, and particularly preferably an integer of 4 or less.

In the general formula (1), l is an integer of 5 or less, preferably an integer of 4 or less, and more preferably an integer of 3 or less.

In the general formula (1), m is an integer of 5 or less, preferably an integer of 4 or less, more preferably an integer of 3 or less, still more preferably an integer of 2 or less, and still more preferably 1.

The compound represented by the general formula (1) and having a molecular weight of less than 200 is preferably a glycol ether-based compound. The glycol ether-based compound has a structure in which a hydrogen atom of a glycol such as ethylene glycol, propylene glycol, or butylene glycol is substituted with an alkyl group.

The compound represented by the general formula (1) has a hydrophobic group and a hydrophilic group in one molecule. Thus, the addition of the compound represented by the general formula (1) can facilitate the dispersion and emulsification of the modified polyolefin resin in water. Therefore, it becomes possible for the dispersion resin composition of the present invention to maintain good storage stability.

More specific examples of the compound represented by the general formula (1) may include ethylene glycol monomethyl ether, ethylene glycol monoethyl ether, ethylene glycol monopropyl ether, ethylene glycol monoisopropyl ether, ethylene glycol monobutyl ether, ethylene glycol monoisobutyl ether, ethylene glycol mono-t-butyl ether, ethylene glycol monohexyl ether, ethylene glycol monodecyl ether, propylene glycol monomethyl ether, propylene glycol monoethyl ether, propylene glycol monopropyl ether, and propylene glycol monobutyl ether. Among these, ethylene glycol monoethyl ether, ethylene glycol monobutyl ether, ethylene glycol mono-t-butyl ether, propylene glycol monomethyl ether, and propylene glycol monopropyl ether are preferable.

The molecular weight of the compound represented by the general formula (1) is less than 200. Thus, it is possible to suppress an increase in boiling point of the modified polyolefin resin aqueous dispersion composition (the dispersion resin composition of the present invention). As a result, after applying the water dispersion composition, or a primer or the like containing the water dispersion composition, drying of the coating film at a high temperature or for a long time can be omitted.

The molecular weight of the compound represented by the general formula (1) is a molecular weight determined from the relative atomic mass approved by Commission on Isotopic Abundances and Atomic Weight of IUPAC (assuming 12C=12).

The compound represented by the general formula (1) and having a molecular weight of less than 200 thereof may be a compound represented by the general formula (1) alone, and two or more types of the compounds represented by the general formula (1) may also be used in combination. In the latter case, the blending ratio of respective compounds is not particularly limited.

(Curing Agent)

Examples of the curing agent may include a polyisocyanate compound, an epoxy compound, a polyamine compound, a polyol compound, and crosslinking agents in which a functional group of the foregoing compounds is blocked with a protective group.

One type of the curing agent may be used alone, and a plurality of types thereof may also be used in combination.

The adding amount of the curing agent may be appropriately selected according to the modification degree K in the modified polyolefin resin. In addition, when a curing agent is added, a catalyst such as an organotin compound or a tertiary amine compound may be used in combination depending on the purpose.

(Adhesive Component)

As the adhesive component, known adhesive components, such as a polyester-based adhesive agent, a polyurethane-based adhesive agent, and an acryl-based adhesive agent, can be used within the range that does not inhibit the desired effects.

Since the dispersion resin composition is excellent in the adhesion between nonpolar resins such as polyolefin-based substrates or between a nonpolar resin and metal, it can be used as an adhesive agent, a primer, and a binder for paints or inks. For example, the dispersion resin composition is useful as an adhesive agent in a laminate film such as an aluminum laminate film.

[Primer and Binder]

The dispersion resin composition of the present invention can be utilized as a primer and a binder for paints or inks. The dispersion resin composition of the present invention is excellent in solution stability and can be suitably utilized as a primer for overcoating a polyolefin substrate such as an automobile bumper and as a painting binder having excellent adhesion with an overcoating paint and a clear.

EXAMPLE

Hereinafter, the present invention will be specifically described by illustrating Examples. The following Examples are intended to suitably illustrate the present invention and do not limit the present invention. The measurement methods of the physical property values and the like are the measurement methods described above unless otherwise stated. In addition, "part" denotes part by mass unless otherwise specified.

[Modification degree K (% by weight)]: The modification degree K was calculated in accordance with JIS K-0070 (1992) as follows. First, about 0.5 g of the modified polyolefin resin precisely weighed and about 100 g of toluene were charged in a 300 ml separable flask equipped with a cooling tube and a thermometer. The mixture was stirred and dissolved under heating on a hot stirrer so that the internal temperature became 80° C. After the resin dissolved, 15 ml of methanol was added, and the mixture was held for 5 minutes. After that, 5 to 6 drops of an indicator (a 1% phenolphthalein-methanol solution) were added, and titration was performed with a 0.1 mol/L potassium hydroxide-ethanol solution. Then, from the titration amount required for neutralization, the modification degree K of the modified polyolefin resin was calculated according to the following equation.

$$K=\{B \times f \times 9.806/(S \times 1000)\} \times 100$$

K represents the modification degree (% by weight); B represents the titration amount (ml) of the potassium hydroxide-ethanol solution; f represents the factor of the 0.1 mol/L potassium hydroxide-ethanol solution; 9.806 is the formular weight of maleic anhydride×1/10; and S represents the weight (g) of the modified polyolefin resin.

[Rate of ring opening R (%)]: The modified polyolefin resin was dissolved in an organic solvent to obtain a solution. This solution was applied onto a KBr plate and dried to form a thin film. Using an FT-IR ("FT/IR-4100", manufactured by JASCO Corporation), the infrared absorption spectrum at 400 to 4000 cm$^{-1}$ was observed. Analysis was performed by an attached software ("Spectro Manager", manufactured by JASCO Corporation).

The peak appearing at a wave number of 1700 to 1750 cm$^{-1}$ was assigned to the peak attributable to the carbonyl group of the α,β-unsaturated carboxylic acid derivative which is ring-opened. The peak height thereof was defined as A. The peak appearing at a wave number of 1750 to 1820 cm$^{-1}$ was assigned to the peak attributable to the carbonyl group of the α,β-unsaturated carboxylic acid derivative which is not ring-opened. The peak height thereof was defined as B. Then, the rate of ring opening R (%) was calculated by substituting the peak heights A and B for (A/(A+B)×100).

[Degree of ring opening]: The degree of ring opening was calculated as the product of the value of the modification degree K and the rate of ring opening R.

[Melting point (° C.)]: The melting point was measured in accordance with JIS K7121 (1987). More specifically, about 5 mg of a sample was held in a heating and melting state at 150° C. for 10 minutes, using a DSC measurement device ("DISCOVERY DSC2500", manufactured by TA Instrument, Japan). The temperature was decreased at a speed of 10° C./min. After −50° C. was reached, the temperature was stably held for 5 minutes. After that, the temperature was increased at 10° C./min to 150° C., and the melting peak temperature when melted was measured as the melting point.

[Weight-average molecular weight (Mw)]: The weight-average molecular weight is the value measured under the following measurement conditions.

Measurement device: HLC-8320GPC (manufactured by Tosoh Corporation)
Eluent: tetrahydrofuran
Column: TSKgel (manufactured by Tosoh Corporation)
Reference material: polystyrene (manufactured by Tosoh Corporation, manufactured by GL Sciences Inc.)
Detector: differential refractometer (manufactured by Tosoh Corporation)
Temperature: 40° C.
Flow speed: 1.0 mL/min

[Average particle diameter (nm)]: The average particle diameter of the dispersion resin composition immediately after its production was measured using a particle size distribution measurement device (Zetasizer Nano ZS (manufactured by Malvern Co.)) by a dynamic light scattering method. The following test was performed only for the dispersion resin composition whose average particle diameter could be measured.

[Stability during centrifugation]: The dispersion resin composition immediately after its production was treated by a centrifuge under the conditions of room temperature and 4000 rpm for 10 minutes. Then, presence or absence of separation and the occurrence of a precipitate was visually confirmed. Evaluation was performed in accordance with the following criteria.

A: No abnormality
B: Small amount of precipitate observed
C: Layer separation, gelled product, and large amount of precipitate observed

[Evaluation of filtration properties]: The filtration speed and the residue amount when 200 mL of the modified polyolefin resin aqueous dispersion (dispersion resin composition) was filtrated with a metal mesh (#400) were evaluated in accordance with the following criteria.

Filtration Speed
A: Filtration completed in less than 1 minute
B: Filtration completed in not less than 1 minute and less than 5 minutes C: Filtration completed in not less than 5 minutes and less than 10 minutes D: Filtration completed in not less than 10 minutes and less than 15 minutes E: Filtration not completed even after 15 minutes or more elapsed Residue Amount A: Absent or trace amount B: Present in small amount C: Present in large amount

[Water Resistance (with Usual Substrate)]

<Preparation of Test Piece>

The surface of an ultra-high stiffness polypropylene plate was degreased with isopropyl alcohol. After that, the modified polyolefin resin aqueous dispersion composition was spray applied onto the degreased surface so that the film thickness (dry coating film) became 10 μm or more and 15 μm or less. Preheating was performed at the melting point of the resin+15° C. for 5 minutes. Next, a Protouch Fine Metallic (manufactured by Rock Paint Co., Ltd.) as a base coat was formulated with a prescribed curing agent and adjusted in viscosity with a dedicated thinner. The obtained product was spray applied onto the coating film so that the dry film thickness became about 20 μm. The product was left to stand for 10 minutes at room temperature. Furthermore, an ECOROCK Hiper Clear S (manufactured by Rock Paint Co., Ltd.) as a clear coat was formulated with a prescribed curing agent and adjusted in viscosity with a dedicated thinner. The obtained product was spray applied onto the resultant coating film so that the dry film thickness became 25 to 30 μm. The product was left to stand for 10 minutes at room temperature. After that, a baking treatment was performed at the melting point of the resin+15° C. for 30 minutes to prepare a test piece.

<Evaluation of Coating Film Appearance>

The test piece prepared as described above was immersed in warm water at 40° C. for 10 days. Then, the coating film appearance (such as presence or absence of the occurrence of a blister) was visually observed and evaluated in accordance with the following criteria.

Coating Film Appearance

A: No abnormality

B: Occurrence of blister of 2 mm or less, but no practical problem

C: Occurrence of blister with a size exceeding 2 mm

<Evaluation of Adhesion>

Next, using a cutter knife, lattice pattern incisions reaching the base spaced 2 mm apart are made on the coating film (11×11 incisions created 100 cells in total). A cellophane tape (manufactured by Nichiban Co., Ltd.) was brought into intimate contact with the incisions and peeled at an angle of 180°. This operation was repeated three times. After that, the adhesion was evaluated by the number of cells which remained unpeeled of the 100 cells.

[Water Resistance (with Poor Adhesion Substrate)]

A test piece was prepared by the same manner as that of the above-described test piece except that a poor adhesion polypropylene plate (formulated with 70% recycled material) was used as the substrate. The coating film appearance and the adhesion thereof were evaluated.

Production Example 1

Using a twin screw extruder set at 220° C., 100.0 parts of a propylene-butene random copolymer [P-B] (propylene component 70 mol %, butene component 30 mol %, Tm=75° C.), 4.0 parts of maleic anhydride, 2.6 parts of lauryl methacrylate, and 1.5 parts of 2,5-dimethyl-2,5-bis(t-butylperoxy)hexane were kneaded to cause the reaction. A strand of the reaction product discharged from a die disposed to the outlet of the extruder was cut by a pelletizer to obtain pellets of the reaction product. The pellets of the reaction product were charged in a large excess of ethyl acetate and stirred at 45° C. for 3 hours for purification. Accordingly, there was obtained a reaction product having a weight-average molecular weight of 78,000, a Tm of 70° C., a maleic anhydride graft weight of 2.6% by weight, and a lauryl methacrylate graft weight of 1.8% by weight.

The purified reaction product was charged in a container having a false bottom. The container was filled with water on its bottom to the degree that the reaction product did not directly touch the water. After that, the container was sealed and stored in an air dryer at 50° C. for 3 days (relative humidity 100%), thereby obtaining a modified polyolefin resin having a rate of ring opening of 64%, that is, a degree of ring opening of 166.

Production Example 2

In a four-necked flask equipped with a stirrer, a cooling tube, and a dropping funnel, 100.0 parts of a propylene-butene random copolymer [P-B] (propylene component 70 mol %, butene component 30 mol %, Tm=75° C.) was heated and dissolved in 400 g of o-xylene. While the system was stirred with the temperature kept at 140° C., 3.2 parts of maleic anhydride was added in a mass. Subsequently, 1.2 parts of di-t-butylperoxide was dropped over 1 hour. After that, the reaction continued for additional 3 hours.

After the reaction ended, and the system was cooled to 40° C. or lower, the reaction product was charged in a large excess of methyl ethyl ketone for purification. Accordingly, there was obtained a reaction product having a weight-average molecular weight of 118,000, a Tm of 70° C., and a maleic anhydride graft weight of 1.9% by weight.

The purified reaction product was charged in a container having a false bottom. The container was filled with water on its bottom to the degree that the reaction product did not directly touch the water. After that, the container was sealed and stored in an air dryer at 50° C. for 3 days (relative humidity 100%), thereby obtaining a modified polyolefin resin having a rate of ring opening of 61%, that is, a degree of ring opening of 116.

Production Example 3

A modified polyolefin resin was obtained by the same manner as that of Production Example 1, except that 100.0 parts of a propylene-butene random copolymer [P-B] (propylene component 80 mol %, butene component 20 mol %, Tm=85° C.), 2.9 parts of maleic anhydride, 2.3 parts of octyl methacrylate, and 1.2 parts of dilauryl peroxide were kneaded using a twin screw extruder set at 190° C., and the temperature during the purification operation was changed to 55° C. The modified polyolefin resin thus obtained had a weight-average molecular weight of 79,000, a Tm of 80° C., a maleic anhydride graft weight of 1.9% by weight, an octyl methacrylate graft weight of 1.5% by weight, and a rate of ring opening of 63%, that is, a degree of ring opening of 120.

Production Example 4

A modified polyolefin resin was obtained by the same manner as that of Production Example 2, except that 100.0 parts of a propylene-butene random copolymer [P-B] (propylene component 80 mol %, butene component 20 mol %, Tm=85° C.) and 3.8 parts of maleic anhydride were used. The modified polyolefin resin thus obtained had a weight-average molecular weight of 121,000, a Tm of 80° C., a maleic anhydride graft weight of 2.3% by weight, and a rate of ring opening of 61%, that is, a degree of ring opening of 140.

Production Example 5

A modified polyolefin resin was obtained by the same manner as that of Production Example 3, except that the temperature of the twin screw extruder was changed to 170° C. The modified polyolefin resin thus obtained had a weight-average molecular weight of 150,000, a Tm of 80° C., a maleic anhydride graft weight of 1.7% by weight, an octyl methacrylate graft weight of 1.3% by weight, and a rate of ring opening of 60%, that is, a degree of ring opening of 102.

Production Example 6

A modified polyolefin resin was obtained by the same manner as that of Production Example 1, except that 100.0 parts of a propylene-butene random copolymer [P-B] (propylene component 90 mol %, butene component 10 mol %, Tm=100° C.), 3.0 parts of maleic anhydride, and 2.0 parts of 2,5-dimethyl-2,5-bis(t-butylperoxy)hexane were kneaded using a twin-screw extruder set at 200° C. and the temperature during the purification operation was changed to 60° C. The modified polyolefin resin thus obtained had a weight-average molecular weight of 75,000, a Tm of 95° C., a maleic anhydride graft weight of 2.0% by weight, and a rate of ring opening of 61%, that is, a degree of ring opening of 122.

Production Example 7

Using a twin screw extruder set at 180° C., 100.0 parts of a propylene-butene random copolymer [P-B] (propylene component 90 mol %, butene component 10 mol %, Tm=100° C.), 3.0 parts of maleic anhydride, and 2.0 parts of 2,5-dimethyl-2,5-bis(t-butylperoxy)hexane were kneaded to cause the reaction. A strand of the reaction product discharged from a die disposed to the outlet of the extruder was cut by a pelletizer to obtain pellets of the reaction product. The pellets of the reaction product were charged in a large excess of ethyl acetate and stirred at 60° C. for 3 hours for purification. Accordingly, there was obtained a reaction product having a weight-average molecular weight of 98,000, a Tm of 95° C., and a maleic anhydride graft weight of 1.7% by weight.

In a sealed space in which the relative humidity was adjusted to 100% by continuously supplying saturated vapor (vapor pressure 0.3 MPa) to achieve 60 to 70° C., the pellets of the purified reaction product were stored for 2 or more days to obtain a modified polyolefin resin having a rate of ring opening of 72%, that is, a degree of ring opening of 122.

Production Example 8

A modified polyolefin resin was obtained by the same manner as that of Production Example 6, except that the set temperature of the twin-screw extruder was changed to 165° C. The modified polyolefin resin thus obtained had a weight-average molecular weight of 133,000, a Tm of 95° C., a maleic anhydride graft weight of 1.7% by weight, and a rate of ring opening of 62%, that is, a degree of ring opening of 105.

Production Example 9

Using a twin screw extruder set at 220° C., 100.0 parts of a propylene-ethylene random copolymer [P-E] (propylene component 89 mol %, ethylene component 11 mol %, Tm=65° C.), 4.0 parts of maleic anhydride, 4.0 parts of lauryl methacrylate, and 2.0 parts of di-t-butylperoxide were kneaded to cause the reaction. Decompression and degassing were performed in the extruder, and the remaining unreacted product was removed to obtain a reaction product having a weight-average molecular weight of 54,000 and a Tm of 64° C. The reaction product was charged in a large excess of acetone for purification. The maleic anhydride and lauryl methacrylate graft weights were measured. The results were 3.2% by weight and 3.0% by weight, respectively.

The purified reaction product was charged in a container having a false bottom. The container was filled with water on its bottom to the degree that the reaction product did not directly touch the water. After that, the container was sealed and stored in an air dryer at 50° C. for 3 days (relative humidity 100%), thereby obtaining a modified polyolefin resin having a rate of ring opening of 65%, that is, a degree of ring opening of 208.

Production Example 10

A modified polyolefin resin was obtained by the same manner as that of Production Example 2, except that 100.0 parts of a propylene-ethylene random copolymer [P-E] (propylene component 89 mol %, ethylene component 11 mol %, Tm=65° C.), and 3.8 parts of maleic anhydride were used. The modified polyolefin resin thus obtained had a weight-average molecular weight of 149,000, a Tm of 64° C., a maleic anhydride graft weight of 2.8% by weight, and a rate of ring opening of 61%, that is, a degree of ring opening of 171.

Production Example 11

A modified polyolefin resin was obtained by the same manner as that of Production Example 2, except that 100.0 parts of a propylene-ethylene-1-butene random copolymer [P-E-B] (propylene component 65 mol %, ethylene component 24 mol %, 1-butene component 11 mol %, Tm=65° C.), and 3.7 parts of maleic anhydride were used. The modified polyolefin resin thus obtained had a weight-average molecular weight of 125,000, a Tm of 60° C., a maleic anhydride graft weight of 2.6% by weight, and a rate of ring opening of 63%, that is, a degree of ring opening of 164.

Production Example 12

Pellets of a reaction product (without performing a ring opening treatment) obtained by the same manner as that of Production Example 9 were charged in a large excess of methyl ethyl ketone. The mixture was stirred at 45° C. for 3 hours for purification. The purified reaction product was left to stand in the atmosphere (about 25° C. and about 50 RH %) for 1 day, thereby obtaining a modified polyolefin resin having a weight-average molecular weight of 54,000, a Tm of 64° C., a maleic anhydride graft weight of 3.2% by weight, a lauryl methacrylate graft weight of 3.0% by weight, and a rate of ring opening of 24%, that is, a degree of ring opening of 77.

Production Example 13

A reaction product (purified, without performing a ring opening treatment) was obtained by the same manner as that of Production Example 11. The purified reaction product was left to stand in the atmosphere (about 25° C. and about 50 RH %) for 1 day, thereby obtaining a modified polyolefin resin having a weight-average molecular weight of 125,000, a Tm of 60° C., a maleic anhydride graft weight of 2.6% by weight, and a rate of ring opening of 28%, that is, a degree of ring opening of 73.

Production Example 14

Pellets of a reaction product (purified, without performing a ring opening treatment) obtained by the same manner as that of Production Example 7 were charged in a container filled with water. While the reaction product was immersed in water, the container was sealed and stored at room temperature (about 25° C.) for 3 days, thereby obtaining a modified polyolefin resin having a weight-average molecular weight of 98,000, a Tm of 95° C., a maleic anhydride graft weight of 1.7% by weight, and a rate of ring opening of 48%, that is, a degree of ring opening of 82.

Production Example 15

A reaction product obtained by the same manner as that of Production Example 1 was purified. Measurement was immediately performed without particularly performing a treatment to promote the ring opening of the purified reaction product. As a result, there was obtained a modified polyolefin resin having a weight-average molecular weight of 78,000, a Tm of 70° C., a maleic anhydride graft weight of 2.6% by weight, a lauryl methacrylate graft weight of 1.8% by weight, and a rate of ring opening of 17%, that is, a degree of ring opening of 44.

Production Example 16

A reaction product obtained by the same manner as that of Production Example 2 was purified. The purified reaction product was charged in a container having a false bottom. The container was filled with water on its bottom to the degree that the reaction product did not directly touch the water. After that, the container was sealed and stored in an air dryer at 50° C. for 8 hours (relative humidity 100%), thereby obtaining a modified polyolefin resin having a weight-average molecular weight of 118,000, a Tm of 70° C., a maleic anhydride graft weight of 1.9% by weight, and a rate of ring opening of 32%, that is, a degree of ring opening of 61.

Production Example 17

A reaction product was purified by the same manner as that of Production Example 4. The purified reaction product was left to stand in the atmosphere (about 25° C. and about 50 RH %) for 1 day, thereby obtaining a modified polyolefin resin having a weight-average molecular weight of 121,000, a Tm of 80° C., a maleic anhydride graft weight of 2.3% by weight, and a rate of ring opening of 25%, that is, a degree of ring opening of 58.

Production Example 18

A reaction product was purified by the same manner as that of Production Example 7. The purified reaction product was charged in a container filled with water. While the reaction product was immersed in water, the container was sealed and stored at room temperature (about 25° C.) for 1 day, thereby obtaining a modified polyolefin resin having a weight-average molecular weight of 98,000, a Tm of 95° C., a maleic anhydride graft weight of 1.7% by weight, and a rate of ring opening of 38%, that is, a degree of ring opening of 65.

Production Example 19

A reaction product was purified by the same manner as that of Production Example 10. Measurement was immediately performed without particularly performing a treatment to promote the ring opening of the purified reaction product. As a result, there was obtained a modified polyolefin resin having a weight-average molecular weight of 149,000, a Tm of 64° C., a maleic anhydride graft weight of 2.8% by weight, and a rate of ring opening of 18%, that is, a degree of ring opening of 50.

Production Example 20

A modified polyolefin resin was obtained by the same manner as that of Production Example 7, except that the set temperature of the twin-screw extruder was changed to 170° C. The modified polyolefin resin thus obtained had a weight-average molecular weight of 103,000, a Tm of 95° C., a maleic anhydride graft weight of 1.6% by weight, and a rate of ring opening of 73%, that is, a degree of ring opening of 117.

Production Example 21

A modified polyolefin resin was obtained by the same manner as that of Production Example 2, except that 100.0 parts of a propylene-butene random copolymer [P-B] (propylene component 80 mol %, butene component 20 mol %, Tm=85° C.) and 7.9 parts of maleic anhydride were used. The modified polyolefin resin thus obtained had a weight-average molecular weight of 112,000, a Tm of 80° C., a maleic anhydride graft weight of 4.3% by weight, and a rate of ring opening of 70%, that is, a degree of ring opening of 301.

Production Example 22

A modified polyolefin resin was obtained by the same manner as that of Production Example 2, except that 100.0 parts of a propylene-butene random copolymer [P-B] (propylene component 80 mol %, butene component 20 mol %, Tm=85° C.) and 10.7 parts of maleic anhydride were used. The modified polyolefin resin thus obtained had a weight-average molecular weight of 105,000, a Tm of 80° C., a maleic anhydride graft weight of 6.0% by weight, and a rate of ring opening of 72%, that is, a degree of ring opening of 432.

Production Example 23

A modified polyolefin resin was obtained by the same manner as that of Production Example 9, except that 100.0 parts of a propylene-ethylene random copolymer [P-E]

(propylene component 91 mol %, ethylene component 9 mol %, Tm=75° C.), 5.0 parts of maleic anhydride, 5.0 parts of lauryl methacrylate, and 2.5 parts of di-t-butyl peroxide were used. The modified polyolefin resin thus obtained had a weight-average molecular weight of 133,000, a Tm of 78° C., a maleic anhydride graft weight of 3.8% by weight, a lauryl methacrylate graft weight of 3.5% by weight, and a rate of ring opening of 70%, that is, a degree of ring opening of 266.

Example 1

In a four-necked flask equipped with a stirrer, a cooling tube, a thermometer, and a dropping funnel, 100 g of the modified polyolefin resin obtained in Production Example 1, 50 g of methyl cyclohexane, and 50 g of propylene glycol monopropyl ether were added. The internal temperature of the flask was adjusted to 85° C., and the mixture was kneaded for 30 minutes. Next, 4 g of morpholine was added, the internal temperature of the flask was adjusted to 85° C., and the mixture was kneaded for 60 minutes. After that, 290 g of deionized water at 90° C. was added over 60 minutes. Subsequently, methyl cyclohexane and propylene glycol monopropyl ether were partly removed under reduced pressure. After that, the temperature was decreased to room temperature under stirring, and the solid content was adjusted with deionized water to become 30% by weight. Accordingly, a modified polyolefin resin aqueous dispersion composition (dispersion resin composition) was obtained. The containing rates of methyl cyclohexane and propylene glycol monopropyl ether in the modified polyolefin resin aqueous dispersion composition were confirmed by gas chromatography. The results were 0.02% by weight and 2.5% by weight relative to the modified polyolefin resin aqueous dispersion composition, respectively.

Example 2

In a four-necked flask equipped with a stirrer, a cooling tube, a thermometer, and a funnel, 100 g of the modified polyolefin resin obtained in Production Example 2, 30 g of toluene, and 100 g of ethylene glycol monobutyl ether were added. The internal temperature of the flask was adjusted to 85° C., and the mixture was kneaded for 30 minutes. Next, 5 g of N,N-dimethylethanolamine was added, the internal temperature of the flask was adjusted to 85° C., and the mixture was kneaded for 60 minutes. After that, 290 g of deionized water at 90° C. was added over 60 minutes. Subsequently, toluene and ethylene glycol monobutyl ether were partly removed under reduced pressure. After that, the temperature was decreased to room temperature under stirring, and the solid content was adjusted with deionized water to become 30% by weight. Accordingly, a modified polyolefin resin aqueous dispersion composition (dispersion resin composition) was obtained. The containing rates of toluene and ethylene glycol monobutyl ether in the modified polyolefin resin aqueous dispersion composition were confirmed by gas chromatography. The results were 0.02% by weight and 1.5% by weight relative to the modified polyolefin resin aqueous dispersion composition, respectively.

Example 3

A modified polyolefin resin aqueous dispersion composition (dispersion resin composition) was obtained by the same manner as that of Example 1, except that the modified polyolefin resin obtained in Production Example 3 was used. The containing rates of methyl cyclohexane and propylene glycol monopropyl ether in the modified polyolefin resin aqueous dispersion composition were 0.02% by weight and 2.3% by weight relative to the modified polyolefin resin aqueous dispersion composition, respectively.

Example 4

A modified polyolefin resin aqueous dispersion composition was obtained by the same manner as that of Example 2, except that the modified polyolefin resin obtained in Production Example 4 was used. The containing rates of toluene and ethylene glycol monobutyl ether in the modified polyolefin resin aqueous dispersion composition were 0.02% by weight and 2.1% by weight relative to the modified polyolefin resin aqueous dispersion composition, respectively.

Example 5

In a four-necked flask equipped with a stirrer, a cooling tube, a thermometer, and a funnel, 100 g of the modified polyolefin resin obtained in Production Example 5, 5 g of EMULGEN 420 (manufactured by Kao Corporation, a polyoxyethylene alkyl ether), 30 g of toluene, and 100 g of ethylene glycol monobutyl ether were added. The internal temperature of the flask was adjusted to 85° C., and the mixture was kneaded for 30 minutes. Next, 5 g of N,N-dimethylethanolamine was added, the internal temperature of the flask was adjusted to 85° C., and the mixture was kneaded for 60 minutes. After that, 290 g of deionized water at 90° C. was added over 60 minutes. Subsequently, toluene and ethylene glycol monobutyl ether were partly removed under reduced pressure. After that, the temperature was decreased to room temperature under stirring, and the solid content was adjusted with deionized water to become 30% by weight. Accordingly, a modified polyolefin resin aqueous dispersion composition (dispersion resin composition) was obtained. The containing rates of toluene and ethylene glycol monobutyl ether in the modified polyolefin resin aqueous dispersion composition were confirmed by gas chromatography. The results were 0.02% by weight and 1.5% by weight relative to the modified polyolefin resin aqueous dispersion composition, respectively.

Example 6

A modified polyolefin resin aqueous dispersion composition (dispersion resin composition) was obtained by the same manner as that of Example 1, except that the modified polyolefin resin obtained in Production Example 6 was used. The containing rates of methylcyclohexane and propylene glycol monopropyl ether in the modified polyolefin resin aqueous dispersion composition were 0.02% by weight and 2.0% by weight relative to the modified polyolefin resin aqueous dispersion composition, respectively.

Example 7

A modified polyolefin resin aqueous dispersion composition (dispersion resin composition) was obtained by the same manner as that of Example 2, except that the modified polyolefin resin obtained in Production Example 7 was used. The containing rates of toluene and ethylene glycol monobutyl ether in the modified polyolefin resin aqueous dispersion composition were 0.01% by weight and 1.3% by weight relative to the modified polyolefin resin aqueous dispersion composition, respectively.

Example 8

A modified polyolefin resin aqueous dispersion composition (dispersion resin composition) was obtained by the same manner as that of Example 5, except that the modified polyolefin resin obtained in Production Example 8 was used. The containing rates of toluene and ethylene glycol monobutyl ether in the modified polyolefin resin aqueous dispersion composition were 0.02% by weight and 2.5% by weight relative to the modified polyolefin resin aqueous dispersion composition, respectively.

Example 9

A modified polyolefin resin aqueous dispersion composition (dispersion resin composition) was obtained by the same manner as that of Example 1, except that the modified polyolefin resin obtained in Production Example 9 was used. The containing rates of methylcyclohexane and propylene glycol monopropyl ether in the modified polyolefin resin aqueous dispersion composition were 0.02% by weight and 2.0% by weight relative to the modified polyolefin resin aqueous dispersion composition, respectively.

Example 10

A modified polyolefin resin aqueous dispersion composition (dispersion resin composition) was obtained by the same manner as that of Example 2, except that the modified polyolefin resin obtained in Production Example 10 was used. The containing rates of toluene and ethylene glycol monobutyl ether in the modified polyolefin resin aqueous dispersion composition were 0.02% by weight and 1.9% by weight relative to the modified polyolefin resin aqueous dispersion composition, respectively.

Example 11

A modified polyolefin resin aqueous dispersion composition (dispersion resin composition) was obtained by the same manner as that of Example 1, except that the modified polyolefin resin obtained in Production Example 11 was used. The containing rates of methylcyclohexane and propylene glycol monopropyl ether in the modified polyolefin resin aqueous dispersion composition were 0.02% by weight and 2.6% by weight relative to the modified polyolefin resin aqueous dispersion composition, respectively.

Example 12

A modified polyolefin resin aqueous dispersion composition (dispersion resin composition) was obtained by the same manner as that of Example 5, except that the modified polyolefin resin obtained in Production Example 12 was used. The containing rates of toluene and ethylene glycol monobutyl ether in the modified polyolefin resin aqueous dispersion composition were 0.02% by weight and 2.1% by weight relative to the modified polyolefin resin aqueous dispersion composition, respectively.

Example 13

A modified polyolefin resin aqueous dispersion composition (dispersion resin composition) was obtained by the same manner as that of Example 2, except that the modified polyolefin resin obtained in Production Example 13 was used. The containing rates of toluene and ethylene glycol monobutyl ether in the modified polyolefin resin aqueous dispersion composition were 0.02% by weight and 2.8% by weight relative to the modified polyolefin resin aqueous dispersion composition, respectively.

Example 14

A modified polyolefin resin aqueous dispersion composition (dispersion resin composition) was obtained by the same manner as that of Example 2, except that the modified polyolefin resin obtained in Production Example 14 was used. The containing rates of toluene and ethylene glycol monobutyl ether in the modified polyolefin resin aqueous dispersion composition were 0.02% by weight and 2.5% by weight relative to the modified polyolefin resin aqueous dispersion composition, respectively.

Example 15

A modified polyolefin resin aqueous dispersion composition (dispersion resin composition) was obtained by the same manner as that of Example 2, except that the modified polyolefin resin obtained in Production Example 20 was used. The containing rates of toluene and ethylene glycol monobutyl ether in the modified polyolefin resin aqueous dispersion composition were 0.01% by weight and 1.4% by weight relative to the modified polyolefin resin aqueous dispersion composition, respectively.

Example 16

A modified polyolefin resin aqueous dispersion composition (dispersion resin composition) was obtained by the same manner as that of Example 2, except that the modified polyolefin resin obtained in Production Example 21 was used. The containing rates of toluene and ethylene glycol monobutyl ether in the modified polyolefin resin aqueous dispersion composition were 0.02% by weight and 2.4% by weight relative to the modified polyolefin resin aqueous dispersion composition, respectively.

Example 17

A modified polyolefin resin aqueous dispersion composition (dispersion resin composition) was obtained by the same manner as that of Example 2, except that the modified polyolefin resin obtained in Production Example 22 was used. The containing rates of toluene and ethylene glycol monobutyl ether in the modified polyolefin resin aqueous dispersion composition were 0.02% by weight and 2.7% by weight relative to the modified polyolefin resin aqueous dispersion composition, respectively.

Example 18

A modified polyolefin resin aqueous dispersion composition (dispersion resin composition) was obtained by the same manner as that of Example 2, except that the modified polyolefin resin obtained in Production Example 23 was used. The containing rates of toluene and ethylene glycol monobutyl ether in the modified polyolefin resin aqueous dispersion composition were 0.01% by weight and 1.8% by weight relative to the modified polyolefin resin aqueous dispersion composition, respectively.

Comparative Example 1

A modified polyolefin resin aqueous dispersion composition (dispersion resin composition) was obtained by the same manner as that of Example 1, except that the modified polyolefin resin obtained in Production Example 15 was used. The containing rates of methyl cyclohexane and propylene glycol monopropyl ether in the modified polyolefin resin aqueous dispersion composition were 0.02% by weight and 2.4% by weight relative to the modified polyolefin resin aqueous dispersion composition, respectively.

Comparative Example 2

The same operation as that of Example 2 was performed, except that the modified polyolefin resin obtained in Production Example 16 was used. However, an aggregate of the modified polyolefin resin was generated during the preparation of the aqueous dispersion, and a modified polyolefin resin aqueous dispersion could not be obtained.

Comparative Example 3

The same operation as that of Example 1 was performed, except that the modified polyolefin resin obtained in Production Example 17 was used. However, an aggregate of the modified polyolefin resin was generated during the preparation of the aqueous dispersion, and a modified polyolefin resin aqueous dispersion could not be obtained.

Comparative Example 4

The same operation as that of Example 2 was performed, except that the modified polyolefin resin obtained in Production Example 18 was used. However, an aggregate of the modified polyolefin resin was generated during the preparation of the aqueous dispersion, and a modified polyolefin resin aqueous dispersion could not be obtained.

Comparative Example 5

The same operation as that of Example 1 was performed, except that the modified polyolefin resin obtained in Production Example 19 was used. However, an aggregate of the modified polyolefin resin was generated during the preparation of the aqueous dispersion, and a modified polyolefin resin aqueous dispersion could not be obtained.

For the dispersion resin compositions obtained in Examples 1 to 18 and Comparative Examples 1 to 5 described above, Table 1 illustrates the type of base resin, the melting point of the modified polyolefin resin, the weight-average molecular weight, the modification degree K (% by weight), the rate of ring opening R (%), the degree of ring opening, the average particle diameter, the use amount of the emulsifier, and the evaluation on filtration properties (filtration speed and residue amount).

TABLE 1

| | BASE RESIN | MELTING POINT (° C.) | WEIGHT-AVERAGE MOLECULAR WEIGHT (Mw, | MODIFICATION DEGREE K (% BY WEIGHT) | RATE OF RING OPENING | DEGREE OF RING OPENING | AMOUNT OF EMULSIFIER (PARTS) | FILTRATION PROPERTIES FILTRATION SPEED | RESIDUE AMOUNT | AVERAGE PARTICLE DIAMETER (nm) |
|---|---|---|---|---|---|---|---|---|---|---|
| EXAMPLE 1 | P-B | 70 | 7.8 | 2.6 | 64 | 166 | 0 | A | A | 110 |
| EXAMPLE 2 | P-B | 70 | 11.8 | 1.9 | 61 | 116 | 0 | A | A | 170 |
| EXAMPLE 3 | P-B | 80 | 7.9 | 1.9 | 63 | 120 | 0 | A | A | 150 |
| EXAMPLE 4 | P-B | 80 | 12.1 | 2.3 | 61 | 140 | 0 | A | A | 180 |
| EXAMPLE 5 | P-B | 80 | 15.0 | 1.7 | 60 | 102 | 5 | A | A | 150 |
| EXAMPLE 6 | P-B | 95 | 7.5 | 2.0 | 61 | 122 | 0 | A | A | 110 |
| EXAMPLE 7 | P-B | 95 | 9.8 | 1.7 | 72 | 122 | 0 | A | A | 130 |
| EXAMPLE 8 | P-B | 95 | 13.3 | 1.7 | 62 | 105 | 5 | A | A | 130 |
| EXAMPLE 9 | P-E | 64 | 5.4 | 3.2 | 65 | 208 | 0 | A | A | 80 |
| EXAMPLE 10 | P-E | 64 | 14.9 | 2.8 | 61 | 171 | 0 | A | A | 150 |
| EXAMPLE 11 | P-E-B | 60 | 12.5 | 2.6 | 63 | 164 | 0 | A | A | 170 |
| EXAMPLE 12 | P-E | 64 | 5.4 | 3.2 | 24 | 77 | 5 | A | B | 130 |
| EXAMPLE 13 | P-E-B | 60 | 12.5 | 2.6 | 28 | 73 | 0 | B | B | 210 |
| EXAMPLE 14 | P-B | 95 | 9.8 | 1.7 | 48 | 82 | 0 | B | B | 230 |
| EXAMPLE 15 | P-B | 95 | 10.3 | 1.6 | 73 | 117 | 0 | A | A | 150 |
| EXAMPLE 16 | P-B | 80 | 11.2 | 4.3 | 70 | 301 | 0 | A | A | 130 |
| EXAMPLE 17 | P-B | 80 | 10.5 | 6.0 | 72 | 432 | 0 | A | A | 110 |
| EXAMPLE 18 | P-E | 78 | 13.3 | 3.8 | 70 | 266 | 0 | A | A | 130 |
| COMPARATIVE EXAMPLE 1 | P-B | 70 | 7.8 | 2.6 | 17 | 44 | 0 | C | C | 270 |
| COMPARATIVE EXAMPLE 2 | P-B | 70 | 11.8 | 1.9 | 32 | 61 | 0 | — | — | EMULSIFICATION FAILURE |
| COMPARATIVE EXAMPLE 3 | P-B | 80 | 12.1 | 2.3 | 25 | 58 | 0 | — | — | EMULSIFICATION FAILURE |
| COMPARATIVE EXAMPLE 4 | P-B | 95 | 9.8 | 1.7 | 38 | 65 | 0 | — | — | EMULSIFICATION FAILURE |
| COMPARATIVE EXAMPLE 5 | P-E | 64 | 14.9 | 2.8 | 18 | 50 | 0 | — | — | EMULSIFICATION FAILURE |

As can be seen from the results of Comparative Examples 1 to 5, when the degree of ring opening of the modified polyolefin resin is less than 70, the average particle diameter is more than 250 nm, or emulsification fails. Therefore, it can be seen that the dispersion resin compositions produced from these modified polyolefin resins are inferior in dispersibility. On the other hand, as can be seen from the results of Examples 1 to 18, when the degree of ring opening of the modified polyolefin resin is 70 or more, the average particle diameter is 250 nm or less. Therefore, the dispersion resin compositions produced from these modified polyolefin resins are excellent in dispersibility regardless of the type of base resin and even when the formulation amount of the emulsifier is less than 10% by weight. Accordingly, it can be said that the dispersion resin composition of the present invention can maintain dispersion stability even if the added amount of the emulsifier is reduced.

Furthermore, as can be seen from the comparison between the results of Example 7 and Example 14, the dispersion resin composition having a rate of ring opening of 60% or more is smaller in average particle diameter and tends to have better filtration properties than the dispersion resin composition having a rate of ring opening of less than 60%. Therefore, a better dispersion resin composition can be obtained.

TABLE 2

| | STABILITY DURING CENTRIFUGATION | WATER RESISTANCE (WITH USUAL SUBSTRATE) | | WATER RESISTANCE (WITH POOR ADHESION SUBSTRATE) | |
|---|---|---|---|---|---|
| | | COATING FILM APPEARANCE | ADHESION | COATING FILM APPEARANCE | ADHESION |
| EXAMPLE 1 | A | A | 100/100 | A | 90/100 |
| EXAMPLE 2 | A | A | 100/100 | A | 99/100 |
| EXAMPLE 3 | A | A | 100/100 | A | 95/100 |
| EXAMPLE 4 | A | A | 100/100 | A | 100/100 |
| EXAMPLE 5 | A | A | 100/100 | A | 100/100 |
| EXAMPLE 6 | A | A | 100/100 | A | 95/100 |
| EXAMPLE 7 | A | A | 100/100 | A | 98/100 |
| EXAMPLE 8 | A | A | 100/100 | A | 99/100 |
| EXAMPLE 9 | A | A | 100/100 | B | 60/100 |
| EXAMPLE 10 | A | A | 100/100 | A | 100/100 |
| EXAMPLE 11 | A | A | 100/100 | A | 100/100 |
| EXAMPLE 12 | B | A | 100/100 | B | 50/100 |
| EXAMPLE 13 | B | A | 100/100 | A | 100/100 |
| EXAMPLE 14 | B | A | 100/100 | A | 95/100 |
| EXAMPLE 15 | A | A | 100/100 | A | 100/100 |
| EXAMPLE 16 | A | A | 100/100 | A | 98/100 |
| EXAMPLE 17 | A | A | 100/100 | B | 80/100 |
| EXAMPLE 18 | A | A | 100/100 | A | 100/100 |
| COMPARATIVE EXAMPLE 1 | C | B | 80/100 | C | 0/100 |
| COMPARATIVE EXAMPLE 2 | — | — | — | — | — |
| COMPARATIVE EXAMPLE 3 | — | — | — | — | — |
| COMPARATIVE EXAMPLE 4 | — | — | — | — | — |
| COMPARATIVE EXAMPLE 5 | — | — | — | — | — |

As understood from Table 2, in the dispersion resin compositions of the present invention, the evaluation of the stability during centrifugation is "A" or "B", demonstrating that they held dispersion stability. The water resistance with a usual substrate is evaluated as having no abnormal appearance and being excellent in adhesion. Also, in the evaluation of the water resistance with a poor adhesion substrate, there is no abnormal appearance, or a blister is only 2 mm or less if any, and adhesion at a practical level can be ensured.

On the other hand, in Comparative Example 1, the stability during centrifugation is evaluated as "C", demonstrating that the dispersion stability was poor. In the evaluation of the water resistance with a usual substrate, a blister of 2 mm or less occurred in the appearance evaluation, and the adhesion was inferior to that of the dispersion resin composition of the present invention. In the evaluation of the water resistance with a poor adhesion substrate, a blister of more than 2 mm occurred, and adhesion was not expressed.

The invention claimed is:

1. A dispersion resin composition, consisting of:
   a modified polyolefin resin in which a modification component comprising an α,β-unsaturated carboxylic acid derivative with a ring structure is introduced to a polyolefin resin;
   an aqueous dispersion medium; and
   optionally, an emulsifier, a neutralizer, an organic solvent, a curing agent or an adhesive component,
   wherein
   if present, an amount of the emulsifier is less than 10% by weight of the composition,
   the modified polyolefin resin is not linked to a polyether resin,
   an average particle diameter of the modified polyolefin resin in the dispersion resin composition is 50 nm or more and 210 nm or less, and
   the modified polyolefin resin has a degree of ring opening, of equation (1), of 70 or more:

degree of ring opening=modification degree $K$×rate of ring opening $R$,   (1):

wherein the modification degree K represents a containing rate (% by weight) of the α,β-unsaturated carboxylic acid derivative relative to the polyolefin resin, and the rate of ring opening R represents a rate of ring opening (%) of the ring structure in the α,β-unsaturated carboxylic acid derivative.

2. The dispersion resin composition according to claim 1, comprising the emulsifier wherein the amount of the emulsifier is less than 5% by weight.

3. The dispersion resin composition according to claim 1, wherein the rate of ring opening R is 60% or more.

4. The dispersion resin composition according to claim 1, wherein a melting point of the modified polyolefin resin is 50° C. or higher.

5. The dispersion resin composition according to claim 1, wherein a weight-average molecular weight of the modified polyolefin resin is 10,000 or more.

6. The dispersion resin composition according to claim 1, wherein the polyolefin resin comprises at least one selected from the group consisting of an ethylene-propylene copolymer, a propylene-1-butene copolymer, and an ethylene-propylene-1-butene copolymer.

7. The dispersion resin composition according to claim 1, wherein the composition includes an organic solvent and the organic solvent is selected from the group consisting of an aromatic solvent, an ester solvent, a ketone solvent, an aliphatic hydrocarbon solvent and an alicyclic hydrocarbon solvent.

8. The dispersion resin composition according to claim 1, wherein the composition includes a curing agent and the curing agent is selected from the group consisting of a polyisocyanate compound, an epoxy compound, a polyamine compound, a polyol compound and a crosslinking agent,
   wherein a functional group of the curing agent is blocked with a protective group.

9. The dispersion resin composition according to claim 1, wherein the composition includes an adhesive component and the adhesive component is selected from the group consisting of a polyester-based adhesive agent, a polyurethane-based adhesive agent and an acryl-based adhesive agent.

* * * * *